United States Patent
Gim et al.

(10) Patent No.: US 12,399,761 B2
(45) Date of Patent: Aug. 26, 2025

(54) SYSTEM AND METHOD FOR FAULT PAGE HANDLING

(71) Applicant: Samsung Electronics Co., Ltd., Suwon-si (KR)

(72) Inventors: Jongmin Gim, Pleasanton, CA (US); Changho Choi, San Jose, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/183,677

(22) Filed: Mar. 14, 2023

(65) Prior Publication Data

US 2024/0272974 A1     Aug. 15, 2024

Related U.S. Application Data

(60) Provisional application No. 63/444,549, filed on Feb. 9, 2023.

(51) Int. Cl.
*G06F 11/00* (2006.01)
*G06F 9/38* (2018.01)
*G06F 9/4401* (2018.01)
*G06F 11/07* (2006.01)

(52) U.S. Cl.
CPC .......... *G06F 11/073* (2013.01); *G06F 9/3816* (2013.01); *G06F 9/4411* (2013.01); *G06F 11/0772* (2013.01)

(58) Field of Classification Search
CPC ............... G06F 11/073; G06F 11/0772; G06F 11/0775; G06F 11/0766; G06F 3/0679; G06F 3/0629; G06F 3/0632; G06F 2003/0697
See application file for complete search history.

(56) References Cited

U.S. PATENT DOCUMENTS

| | | |
|---|---|---|
| 6,708,291 B1 | 3/2004 | Kidder |
| 7,328,376 B2 | 2/2008 | McGuire et al. |
| 7,340,582 B2 | 3/2008 | Madukkarumukumana et al. |
| 8,201,024 B2 | 6/2012 | Burger et al. |
| 9,262,270 B2 | 2/2016 | Jayaprakash Bharadwaj et al. |
| 9,424,201 B2 | 8/2016 | Duluk et al. |
| 9,767,036 B2 | 9/2017 | Duluk et al. |
| 9,891,980 B2 | 2/2018 | Ginzburg et al. |
| 10,552,337 B2 | 2/2020 | Liu et al. |

(Continued)

OTHER PUBLICATIONS

Schofield, Alison, et al., [Patch 0/3] CXL Poison List Retrieval & Tracing, lore.kernel.org, 2022 (Year: 2022).*

(Continued)

*Primary Examiner* — Marc Duncan
(74) *Attorney, Agent, or Firm* — Lewis Roca Rothgerber Christie LLP

(57) ABSTRACT

A system and method for fault page handling. In some embodiments, the method includes: querying a memory device for fault pages in the memory device; and receiving a response from the memory device identifying a fault page. The querying of the memory device may include querying the memory device by a device driver; and the querying of the memory device may include querying the memory device using a supplemental command of a cache coherent protocol.

20 Claims, 11 Drawing Sheets

Query a memory device for errored pages in the memory device
705

Receive a response from the memory device identifying an errored page
705

Offline the errored page
705

(56) References Cited

U.S. PATENT DOCUMENTS

| | | | |
|---|---|---|---|
| 2011/0004719 A1* | 1/2011 | Fitzgerald | G11C 16/0408 |
| | | | 711/E12.084 |
| 2021/0149763 A1 | 5/2021 | Ranganathan et al. | |
| 2021/0389956 A1 | 12/2021 | Li et al. | |
| 2022/0050603 A1 | 2/2022 | Zhou et al. | |
| 2022/0197556 A1 | 6/2022 | Bert et al. | |
| 2024/0176745 A1* | 5/2024 | Bert | G06F 12/0871 |

OTHER PUBLICATIONS

Computer Express Link Specification Revision 2.0, 2020, CXL Consortium (Year: 2020).*

Anon. CXL (Compute Express Link) Part 12—Poison and CXL.io Commands: Media and Poison Management, Feb. 4, 2022, 15 pages.

European Search Report for EP Application No. 23219023.1 dated Jun. 17, 2024, 7 pages.

Gurumurthi, S., et al. "An Overview of Reliability, Availability, and Serviceability (RAS) in Compute Express Link TM 2.0," Jan. 30, 2021, 18 pages.

Intel "Compute Express Link v. 3.0," Aug. 1, 2022, pp. 572-899.

* cited by examiner

SYSTEM AND METHOD FOR FAULT PAGE HANDLING

CROSS-REFERENCE TO RELATED APPLICATION(S)

The present application claims priority to and the benefit of U.S. Provisional Application No. 63/444,549 filed Feb. 9, 2023, the entire content of which is incorporated herein by reference.

FIELD

One or more aspects of embodiments according to the present disclosure relate to computing systems, and more particularly to a system and method for fault page handling.

BACKGROUND

A memory device connected to a host through an interface such as a Compute Express Link interface may, from time to time, experience failures of memory cells. As a result, data stored in such cells may be unreliable if the failures result in uncorrectable errors.

It is with respect to this general technical environment that aspects of the present disclosure are related.

SUMMARY

According to an embodiment of the present disclosure, there is provided a method, including: querying a memory device for fault pages in the memory device; and receiving a response from the memory device identifying a fault page, wherein: the querying of the memory device includes querying the memory device by a device driver; and the querying of the memory device includes querying the memory device using a supplemental command of a cache coherent protocol.

In some embodiments, the cache coherent protocol includes an input/output protocol, a protocol for accessing system memory, and a protocol for accessing device memory.

In some embodiments, the querying of the memory device includes querying the memory device in connection with device driver probing.

In some embodiments: the device driver is configured to run in a host; the host is connected to the memory device; and the querying of the memory device includes performing querying of the memory device related to boot-up of the host.

In some embodiments: the device driver is configured to run in a host; the host is connected to the memory device; and the querying of the memory device includes performing querying of the memory device related to connecting of the memory device to a host.

In some embodiments: the device driver is configured to run in a host; the host is connected to the memory device; and the querying of the memory device includes querying of the memory device based on a message sent to the host, the message notifying the host of detection of a fault page.

In some embodiments: the response from the memory device identifies a fault cache line; and the method further includes: converting a device physical address of the fault cache line to a host physical address of the fault cache line.

In some embodiments: the response from the memory device includes a first list of fault cache lines and a second list of fault cache lines; and the method further includes: combining the first list and the second list.

In some embodiments: the response from the memory device identifies a first fault cache line and a second fault cache line; and the method further includes: converting a device physical address of the first fault cache line to a host physical address of the first fault cache line; and converting a device physical address of the second fault cache line to a host physical address of the second fault cache line.

In some embodiments: the response from the memory device identifies a first fault cache line and a second fault cache line; and the method further includes: determining that the second fault cache line is in a same page as the first fault cache line; and replacing the first fault cache line and the second fault cache line with the first fault cache line.

According to an embodiment of the present disclosure, there is provided a system, including: a host including: a processing circuit; and memory connected to the processing circuit, the memory storing instructions that, when executed by the processing circuit, causes performance of a method, the method including: querying a memory device for fault pages in the memory device; and receiving a response from the memory device identifying a fault page, wherein: the querying of the memory device includes querying the memory device by a device driver; and the querying of the memory device includes querying the memory device using a supplemental command of a cache coherent protocol.

In some embodiments, the cache coherent protocol includes an input/output protocol, a protocol for accessing system memory, and a protocol for accessing device memory.

In some embodiments, the querying of the memory device includes querying the memory device in connection with device driver probing.

In some embodiments: the device driver is configured to run in the host; the host is connected to the memory device; and the querying of the memory device includes performing querying of the memory device related to boot-up of the host.

In some embodiments: the device driver is configured to run in the host; the host is connected to the memory device; and the querying of the memory device includes performing querying of the memory device related to connecting of the memory device to the host.

In some embodiments: the device driver is configured to run in the host; the host is connected to the memory device; and the querying of the memory device includes querying of the memory device based on a message sent to the host, the message notifying the host of detection of a fault page.

In some embodiments: the response from the memory device identifies a fault cache line; and the method further includes: converting a device physical address of the fault cache line to a host physical address of the fault cache line.

In some embodiments: the response from the memory device includes a first list of fault cache lines and a second list of fault cache lines; and the method further includes: merging the first list and the second list.

In some embodiments: the response from the memory device identifies a first fault cache line and a second fault cache line; and the method further includes: converting a device physical address of the first fault cache line to a host physical address of the first fault cache line; and converting a device physical address of the second fault cache line to a host physical address of the second fault cache line.

According to an embodiment of the present disclosure, there is provided a system, including: a host including: means for processing; and memory connected to the means for processing, the memory storing instructions that, when executed by the means for processing, causes performance of a method, the method including: querying a memory device for fault pages in the memory device; and receiving a response from the memory device identifying a fault page, wherein: the querying of the memory device includes querying the memory device by a device driver; and the querying of the memory device includes querying the memory device using a supplemental command of a cache coherent protocol.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
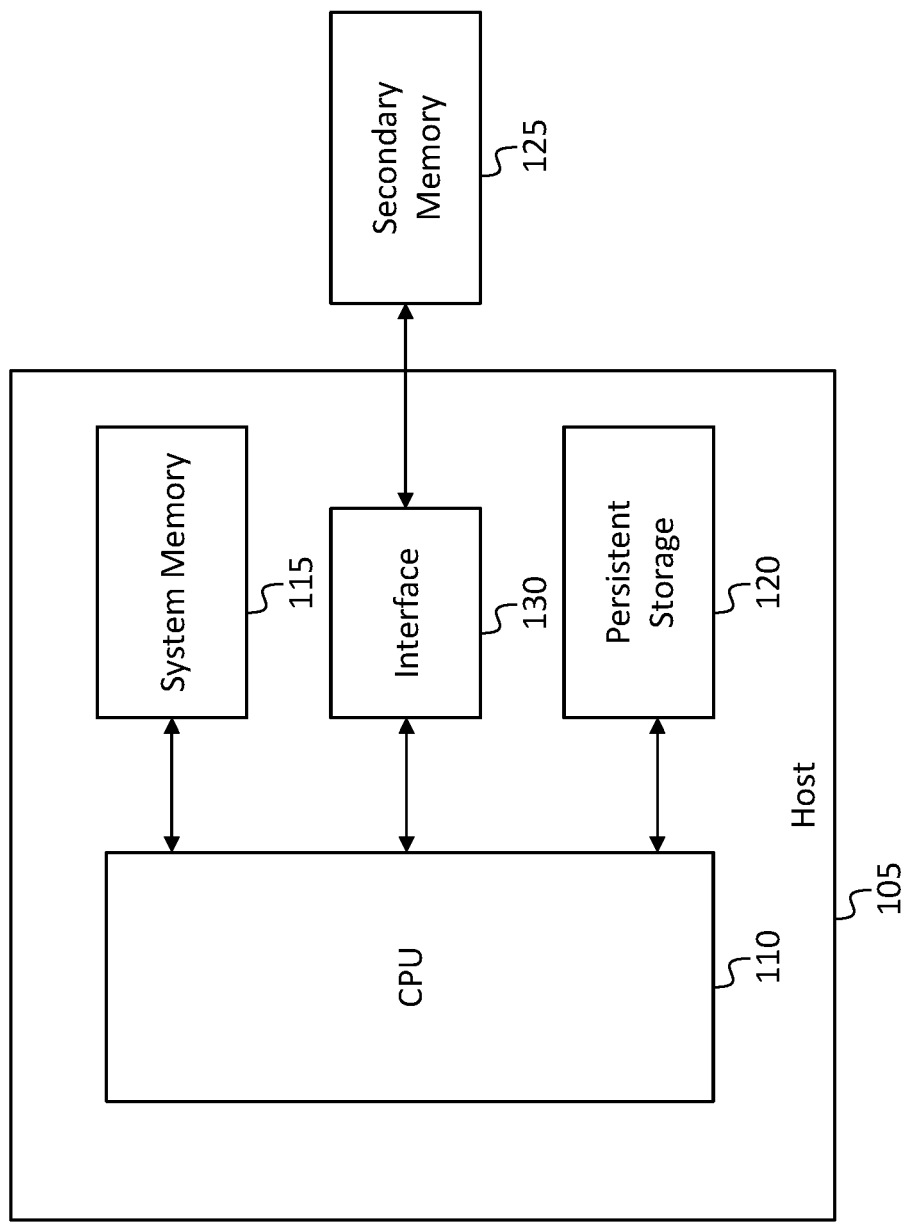
FIG. 1 is a system diagram, according to an embodiment of the present disclosure.

The detailed description set forth below in connection with the appended drawings is intended as a description of exemplary embodiments of a system and method for fault page handling provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A memory device connected to a host system by a cache-coherent interface (e.g., by any suitable version of a Compute Express Link™ interface (which may include an input/output protocol, a protocol for accessing system memory, and a protocol for accessing device memory), or any similar cache coherent interface) may enable the expansion of memory capacity. Such a memory device may store primarily noncritical data, such as anonymous data, files, and movable data. With such a memory device, it may not readily be possible to handle uncorrectable (poison) fault pages (e.g., pages of memory having a sufficiently large number of bit errors that the error-correction code employed is unable to correct them) in a manner that reliably avoids access to such pages by applications using the memory device. For example, machine check exception log (MCE-log), a user level reliability, availability, serviceability (RAS) utility, may be used by an application to detect fault pages. However, at system boot-up, some time may elapse before MCELog starts up; during this interval of delay an application may access fault pages before they have been "offlined", or disabled, so that they are not available for access by kernel level processes or user level processes. More generally user-level processes may not be ideally suited for addressing hardware failures. Moreover, at reboot or when a memory device is disconnected and then reconnected without system power being shut off, the host may lack a mechanism for determining whether the memory device connected to the host is the same memory device as a memory device that was previously connected; this uncertainty may be an obstacle to re-using poison list information from a device that was previously connected to the host.

As such, in some embodiments, a device driver for the memory device may use a supplemental command to retrieve a poison list from the memory device, in several circumstances. As used herein, a "supplemental command" is a command that includes an argument identifying a feature (and that may include additional arguments). The feature, for example, may be the reporting of fault pages. The circumstances may include (i) bootup of the host, (ii) connecting of the memory device while the system is powered up and (iii) reporting of an error (which may or may not have been triggered by the detection of a previously undetected fault page) by the memory device. In such an embodiment, the device driver may be able to disable any fault pages before any pages are made available to applications, and, as a result, there may not be a time interval during which applications are able to access fault pages.

FIG. 1 shows a portion of a computing system, in some embodiments. The computing system includes a host 105 including a central processing unit (CPU) 110, a system memory 115 (which may be or include dynamic random access memory (DRAM)), and persistent storage 120 (which may be a solid-state drive (SSD)). The host 105 may also be connected to (or, in some embodiments, include) one or more secondary memories 125, which may be or include DRAM, connected to the central processing unit 110 through an interface 130. For example, the interface may be a host Peripheral Component Interconnect Express (PCIe) root complex and the secondary memory 125 may be configured as a Peripheral Component Interconnect Express (PCIe) endpoint. In such an embodiment, the communications protocol between the host 105 and the secondary memory 125 may be a cache coherent protocol, e.g., Compute Express Link (CXL) (in which case the supplemental command may be a mailbox command). The terminology used herein treats the secondary memory 125 as a component that is separate from, and connected to, the host 105 (although it may share an enclosure with the host 105).

The system memory 115 may from time to time, experience hardware failures of one or more memory cells. These failures may be detected as "errors" by circuitry of the system memory 115. In a Linux system, a user-level utility, e.g., machine check exception log (MCElog), may provide reliability, availability, serviceability (RAS) support, and disable pages with errors, using data structures defined in the System Management Basic Input/Output System (BIOS) (SMBIOS), such as Type 17 (defined in the System Management Basic Input/Output System), which defines various attributes for system memory. Such a system may, by disabling pages with errors (which may be referred to as fault pages), prevent applications running on the host from accessing memory pages with data that is invalid because of errors.

Figure 2A:
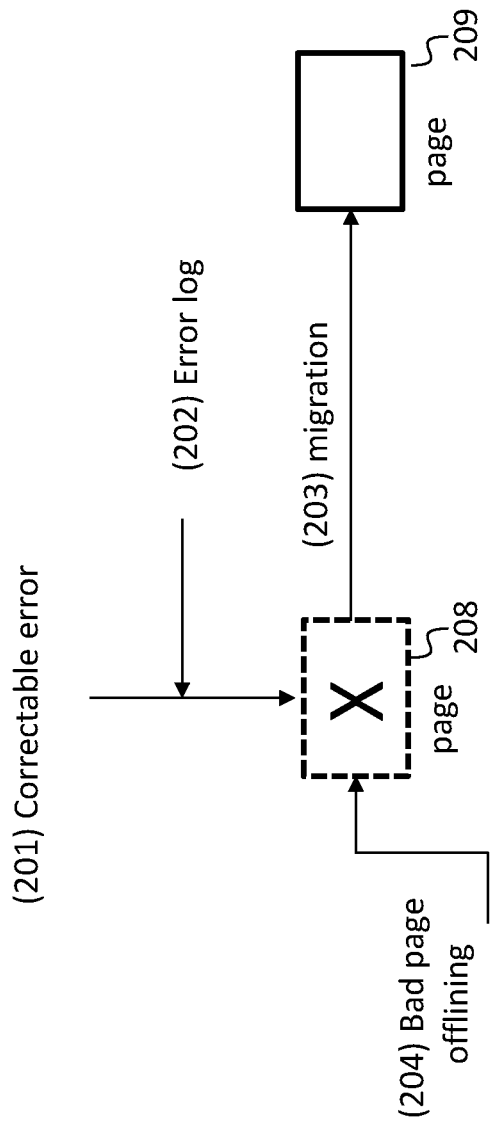
FIG. 2A is a hybrid flow chart and block diagram showing soft disabling, according to an embodiment of the present disclosure.
Figure 2B:
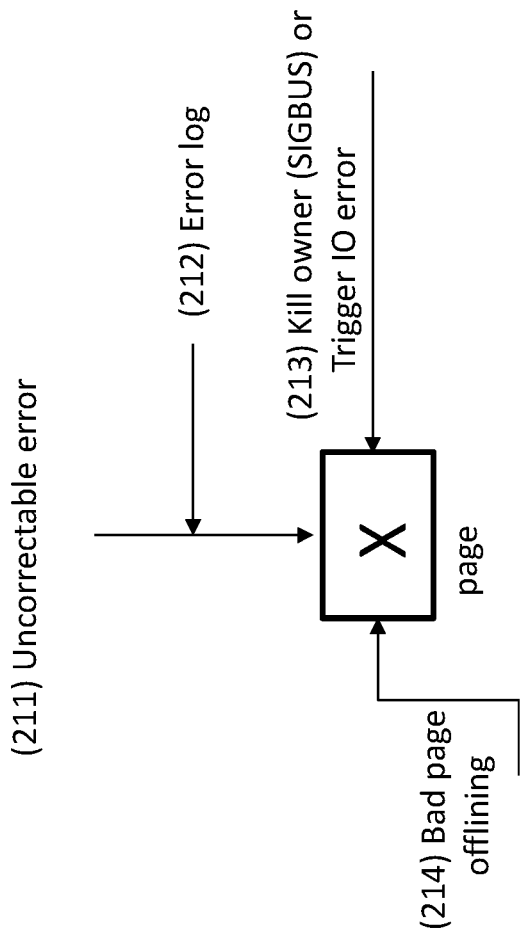
FIG. 2B is a hybrid flow chart and block diagram showing hard disabling, according to an embodiment of the present disclosure.

Disabling of pages may be performed as illustrated in FIG. 2A and FIG. 2B. FIG. 2A illustrates soft disabling, which may be performed when a correctable error is detected in a fault page 208 of system memory 115. To reduce the risk that such an error may become an uncorrectable error (as a result of additional failures in memory cells, resulting in a number of bit errors exceeding the number that can be corrected using error correcting code), after a correctable error is detected, at 201, the error may be logged, at 202, in an error log; the data may, at 203, be migrated to a different page 209 in the system memory 115; and the page containing the correctable error may be disabled (made unavailable) at 204.

FIG. 2B illustrates hard disabling, which may be performed when an uncorrectable error is detected in a fault page 208 of system memory 115. After an uncorrectable error is detected, at 211, the error may be logged, at 212, in an error log. The hardware may then raise a bus error (SIGBUS), notifying the operating system (OS) that a process is attempting to access memory that the central processing unit 110 cannot physically address because the instruction being executed includes an invalid address for the address bus. This may result in killing the process (the owner) that owns the thread of which the instruction at issue is a part. The page containing the uncorrectable error may then be disabled (made unavailable) at 214.

The secondary memory 125 may also, from time to time, experience hardware failures of one or more memory cells. These failures may be detected by circuitry of the secondary memory 125. The mechanisms described above for handling fault pages in the system memory 115 may not be readily adaptable for the handling of fault pages in the secondary memory 125, because, for example, data allowing the host to uniquely identify a secondary memory 125 may not be available. Type 17, for example may not be applicable to the secondary memory 125 (as a result, for example, of Type 17 not being available to PCIe devices).

Figure 2C:
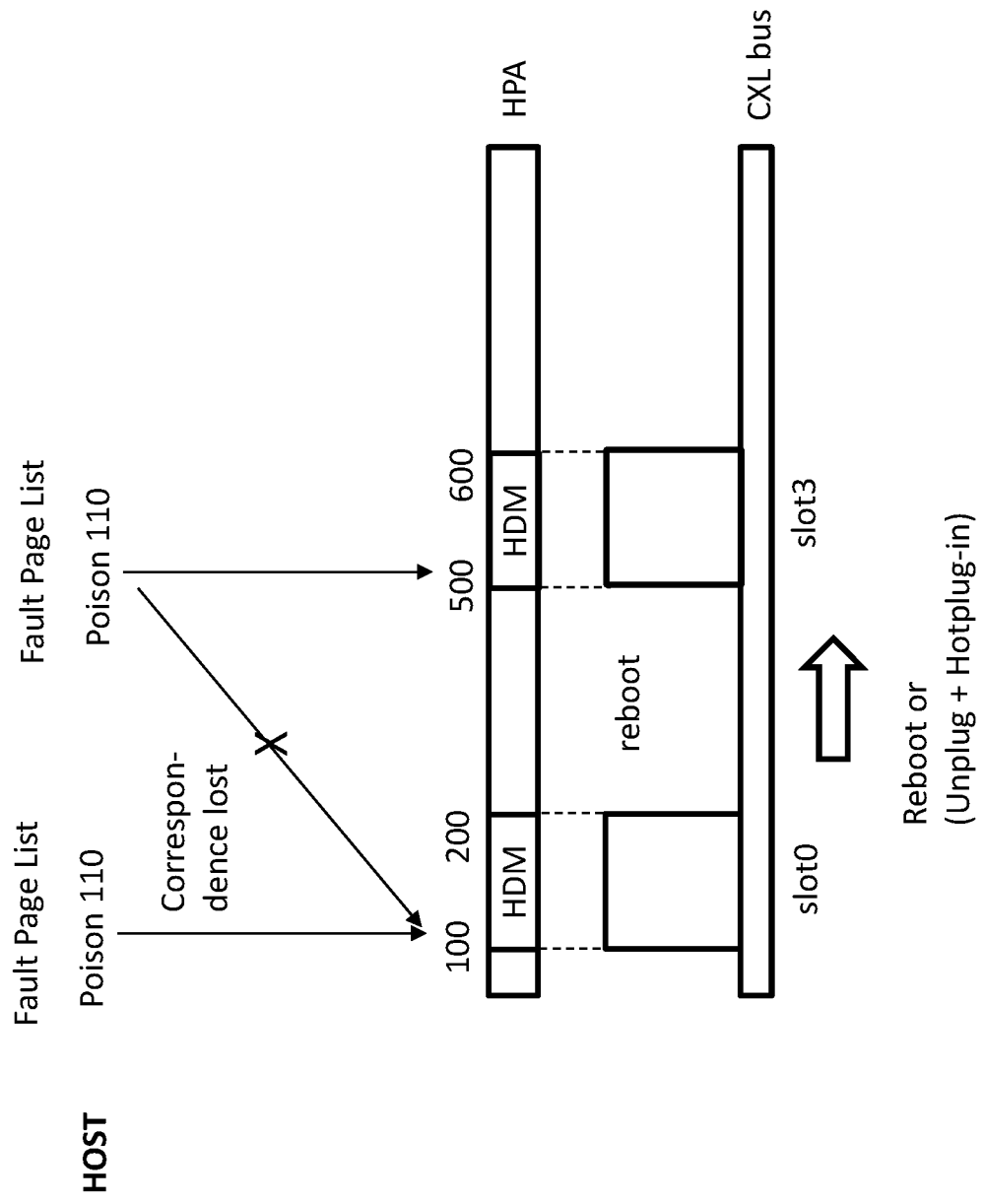
FIG. 2C is an illustration of system rebooting or plugging in of a memory device with the memory device being moved to a different slot, according to an embodiment of the present disclosure.

As mentioned above, the inability of the host to uniquely identify a secondary memory 125 may be an obstacle to the host's correctly disabling pages when contact with the secondary memory 125 is lost and re-established, as in the case, for example, of a host reboot or of disconnecting and re-connecting, of the secondary memory 125, while the system is powered up. For example, referring to FIG. 2C, a secondary memory 125 may be a Compute Express Link device (CXL dev) which may initially be plugged into slot 0 of the host. In host defined memory (HDM), the secondary memory 125 may initially be mapped to a first range of host memory addresses (ranging from 100 to 200), and a page at address 110 may be a fault page. The secondary memory 125 may then be unplugged from slot 0 of the host and plugged back in to slot 3 of the host. This may occur with the host first being shut down (before the unplugging) and then being booted up again (after the plugging back in), or it may occur without the host being shut down. In either case (whether or not the host is shut down) the moving of the secondary memory 125 from slot 0 to slot 3 may cause the secondary memory 125 to become mapped to a different range of addresses in host defined memory (e.g., to addresses 500-600, as shown in FIG. 2C). This may have the effect that it is the page at host defined memory address 510 that is a fault page, but the host, lacking a way to determine that the secondary memory 125 plugged in to slot 3 is the same device that was previously plugged in to slot 0, may lack sufficient information to conclude whether or not the page at host defined memory address 510 is a fault page, e.g., the correspondence between the device plugged into slot 3 and the device previously plugged in to slot 0 may have been lost when the secondary memory 125 was unplugged and plugged in again. As such, the host may be unable to properly disable fault pages after a reboot, or after unplugging and plugging back in of a secondary memory 125 when the secondary memory 125 is plugged into a different slot afterwards.

Figure 2D:
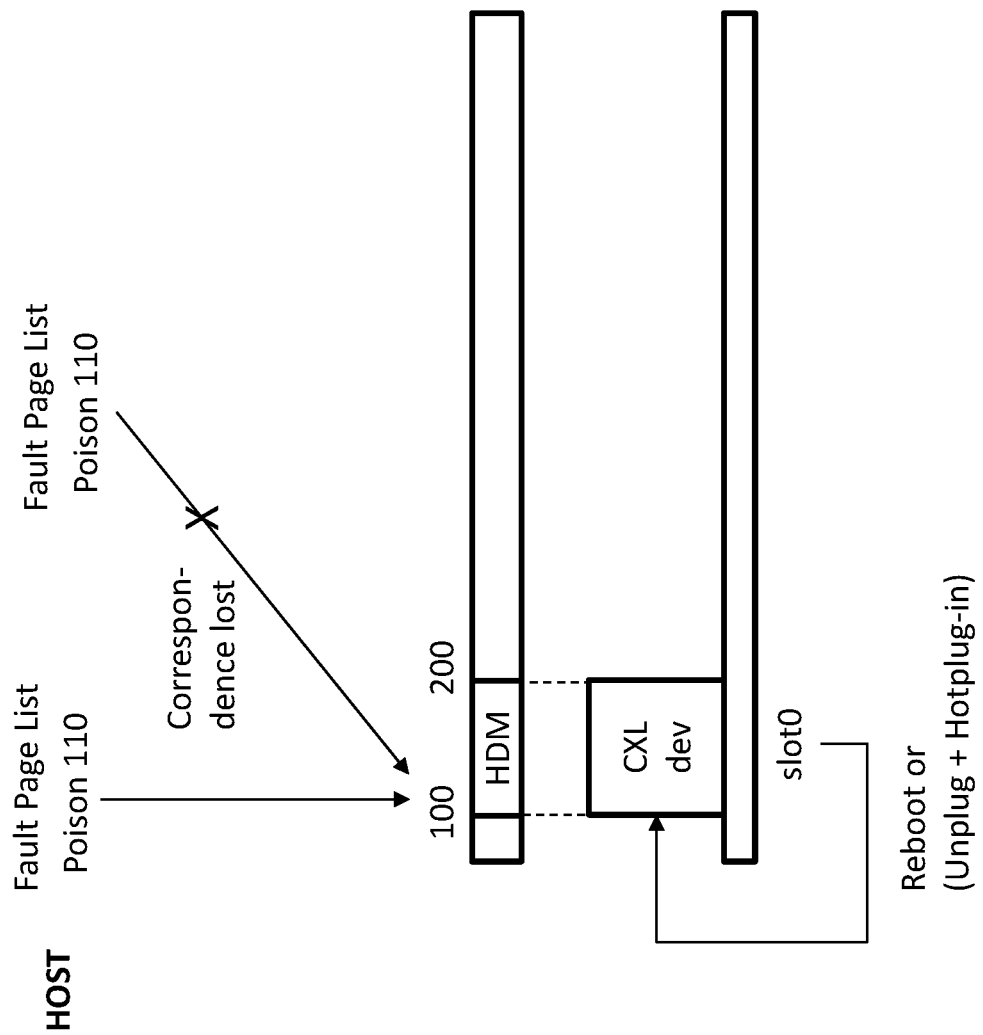
FIG. 2D is an illustration of system rebooting or plugging with in of a memory device with the memory device not being moved to a different slot, according to an embodiment of the present disclosure.

Referring to FIG. 2D, a similar loss of correspondence may occur if the host is rebooted without unplugging the secondary memory 125, or if the secondary memory 125 is unplugged and then plugged back into the same slot (e.g., slot 0), without shutting off system power. Although in this situation, the address in host defined memory (e.g., address 110) may be the same after the rebooting or after the unplugging and plugging back in, the host may be unable to determine, in each situation, whether the secondary memory 125 plugged into slot 0 after the rebooting or after the unplugging and plugging back in is the same device as the secondary memory 125 plugged into slot 0 after the rebooting or after the unplugging and plugging back in. As such, the host may be unable to properly disable fault pages after a reboot, or after unplugging and plugging back in of a secondary memory 125 even when the secondary memory 125 is plugged into the same slot afterwards.

In some embodiments, therefore, the host 105 may query the secondary memory 125 for fault pages and disable the pages accordingly. In the case of a secondary memory 125 that is a Compute Express Link device, the querying may be performed using a supplemental command, e.g., (in a Compute Express Link system) using a get_event_records mailbox command, using a get_poison_list mailbox command, or using a scan_media mailbox command. In some embodiments, these operations are performed by a device driver for the secondary memory 125. Each such command may cause the secondary memory 125 to return to the host a list of fault addresses, which may allow the host, in response, to disable the corresponding fault pages.

Figure 3:
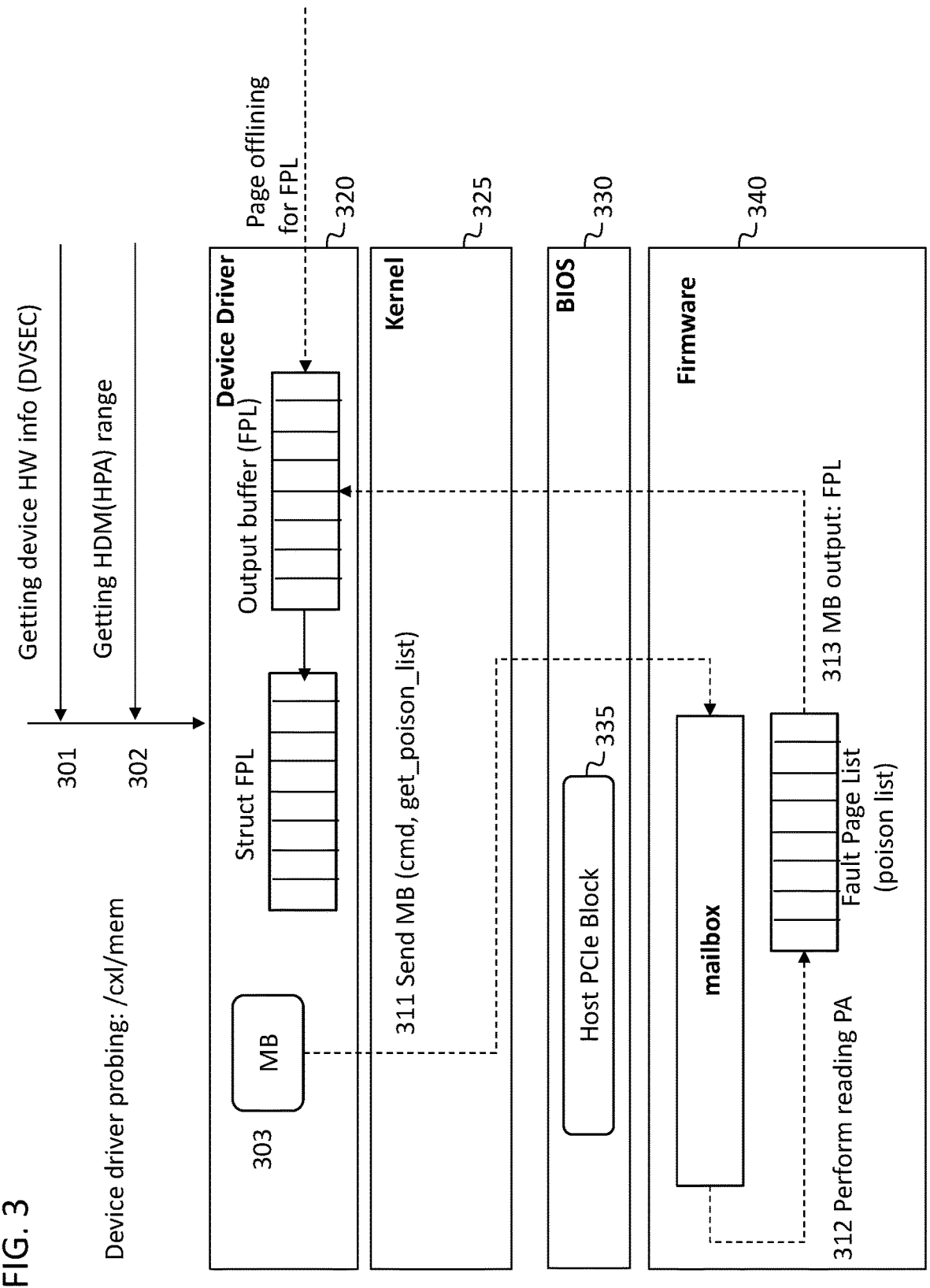
FIG. 3 is a hybrid flow chart and block diagram showing page disabling at bootup, according to an embodiment of the present disclosure.

FIG. 3 shows how this may be accomplished during the device driver probing phase, e.g., at bootup of the host, or when the secondary memory 125 is first connected to the host 105 (e.g., while the host 105 is powered up). For example, as illustrated in FIG. 3, at 301 the device driver 320 may get device hardware (HW) information from the secondary memory 125 using designated vendor-specific extended capabilities (DVSEC) and, at 302, get a host defined memory address range (e.g., a host physical address (HPA) range) corresponding to the memory address range of the secondary memory 125. The device driver 320 may generate a supplemental (e.g., mailbox (MB)) command at 303 and send the command, at 311, using a suitable function call to the operating system kernel 325, to the firmware 340 of the secondary memory 125. The kernel 325 may arrange for the supplemental command to be directed to the secondary memory 125 using data stored in the Peripheral Component Interconnect Express (PCIe) block 335 of the Basic Input/Output System (BIOS) 330 of the host 105.

In response to receiving the supplemental command (e.g., a get_event_records mailbox command, a get_poison_list mailbox command, or a scan_media mailbox command), the firmware 340 of the secondary memory 125 may read, at 312, a list of physical addresses (PAs) from its internal metadata storage. This list may be referred to as a fault page list (FPL), or as a fault page list, or as a poison list. The firmware 340 of the secondary memory 125 may then generate the supplemental command (e.g., mailbox (MB)) output (e.g., the fault page list (FPL)) and return it to the device driver 320. The device driver 320 may perform address translation and various other processing operations (discussed in further detail below) on the fault page list stored in the output buffer of the device driver 320, and generate a fault page list structure (struct FPL) translated into host physical addresses and suitable for disabling fault pages.

Figure 4A:
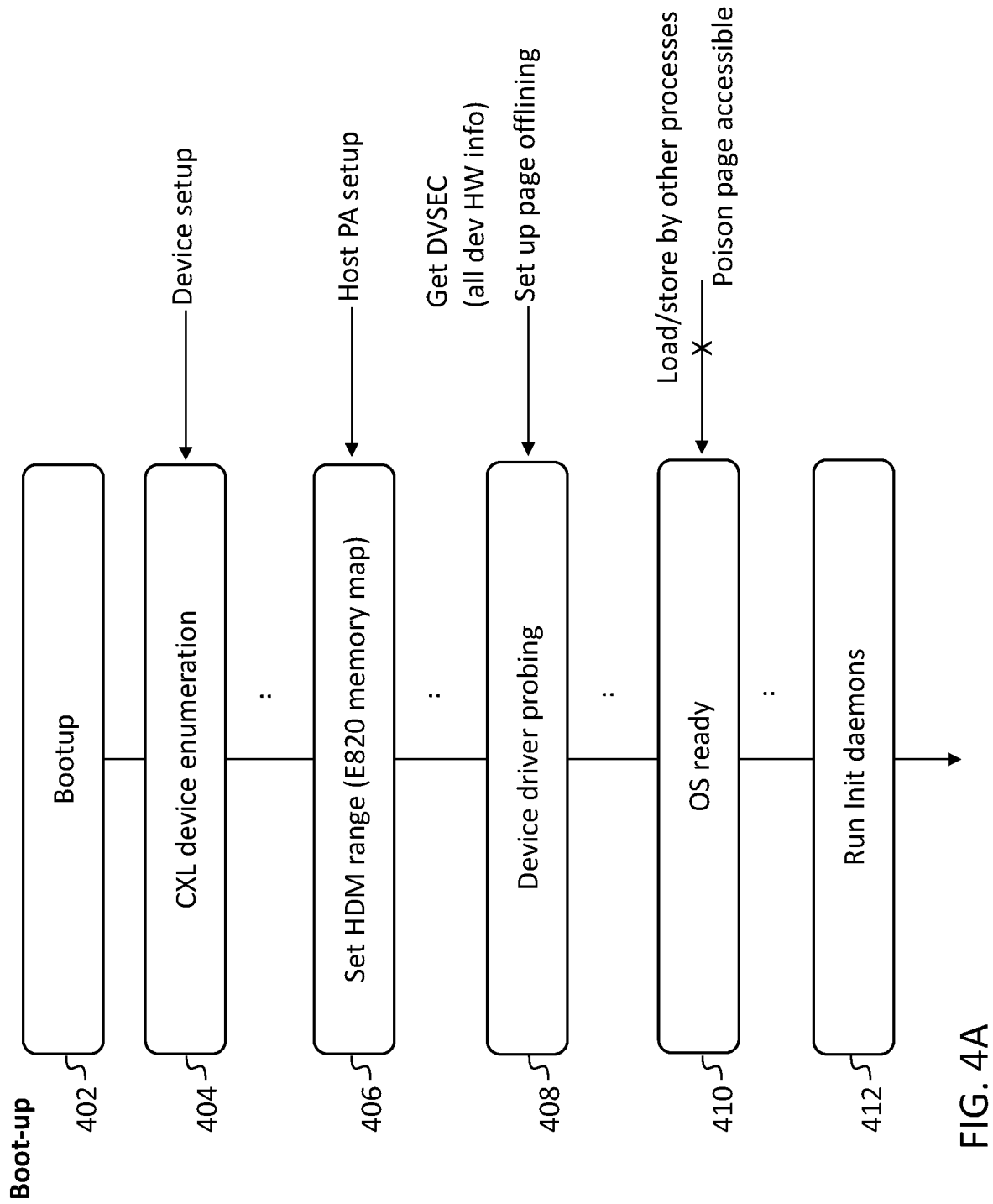
FIG. 4A is a flow chart showing page disabling at bootup, according to an embodiment of the present disclosure.

FIG. 4A shows a method for disabling fault pages at bootup, in some embodiments. At 402, the host 105 is booted up. At 404, the operating system of the host 105 performs enumeration of Peripheral Component Interconnect Express devices, including Compute Express Link devices, and performs device setup. At 406, the host 105 performs physical address (PA) setup and sets the host defined memory range (which may be stored in table E820 of the host 105, a physical address map table). At 408, the device driver 320 may perform device driver probing and may get device hardware (HW) information from the secondary memory 125 using designated vendor-specific extended capabilities (DVSEC). In this operation, the device driver 320 may also, as discussed above, use a supplemental command to obtain a fault page list from the secondary memory 125, and disable the fault pages. At 410 the operating system (OS) may complete the bootup process, and load and store operations, accessing the secondary memory 125, may be performed by applications running on the host 105. These applications may be incapable of inadvertently accessing a poison page (e.g., a fault page) (as indicated by the "X" in FIG. 4A), because the fault pages will already have been disabled. At 412, daemons (such as MCELog) may be initialized (e.g., init daemons may be run).

Figure 4B:
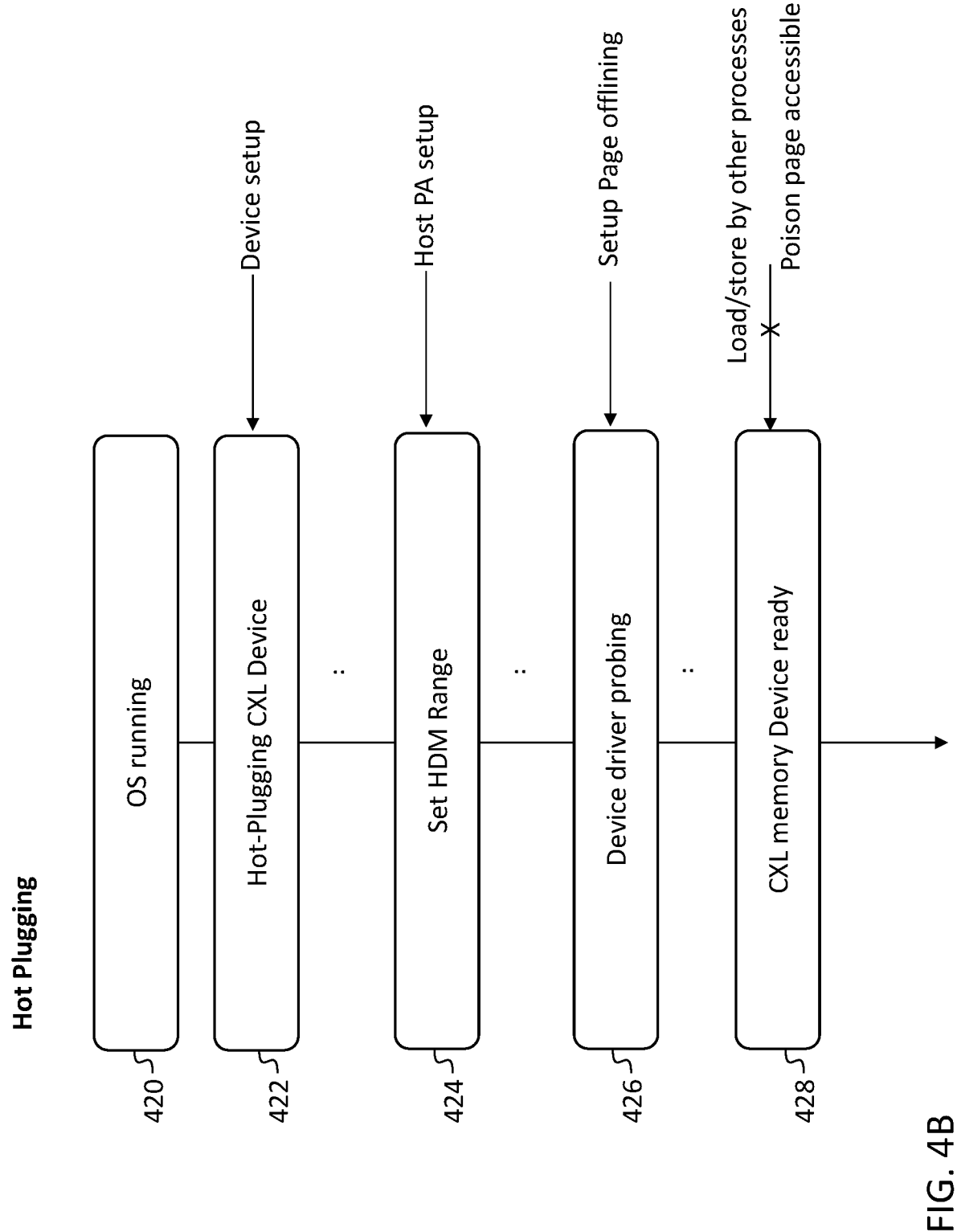
FIG. 4B is a flow chart showing page disabling at plugging in of a memory device, according to an embodiment of the present disclosure.

FIG. 4B shows a method for disabling fault pages at plugging of a secondary memory 125, in some embodiments. At 420 the operating system is running (having been previously booted up), and, at 422 the secondary memory 125 may be connected, without shutting off system power, to the host 105. At 424, the host 105 performs physical address (PA) setup and sets the host defined memory range. At 426, the device driver 320 may perform device driver probing and may get device hardware (HW) information from the secondary memory 125 using designated vendor-specific extended capabilities (DVSEC). In this operation, the device driver 320 may also, as discussed above, use a supplemental command to obtain a fault page list from the secondary memory 125, and disable the fault pages. At 428, the secondary memory 125 may be ready for use, and load and store operations, accessing the secondary memory 125, may be performed by applications running on the host 105. These applications may be incapable of inadvertently accessing a poison page (e.g., a fault page) (as indicated by the "X" in FIG. 4B), because the fault pages will already have been disabled.

Figure 5:
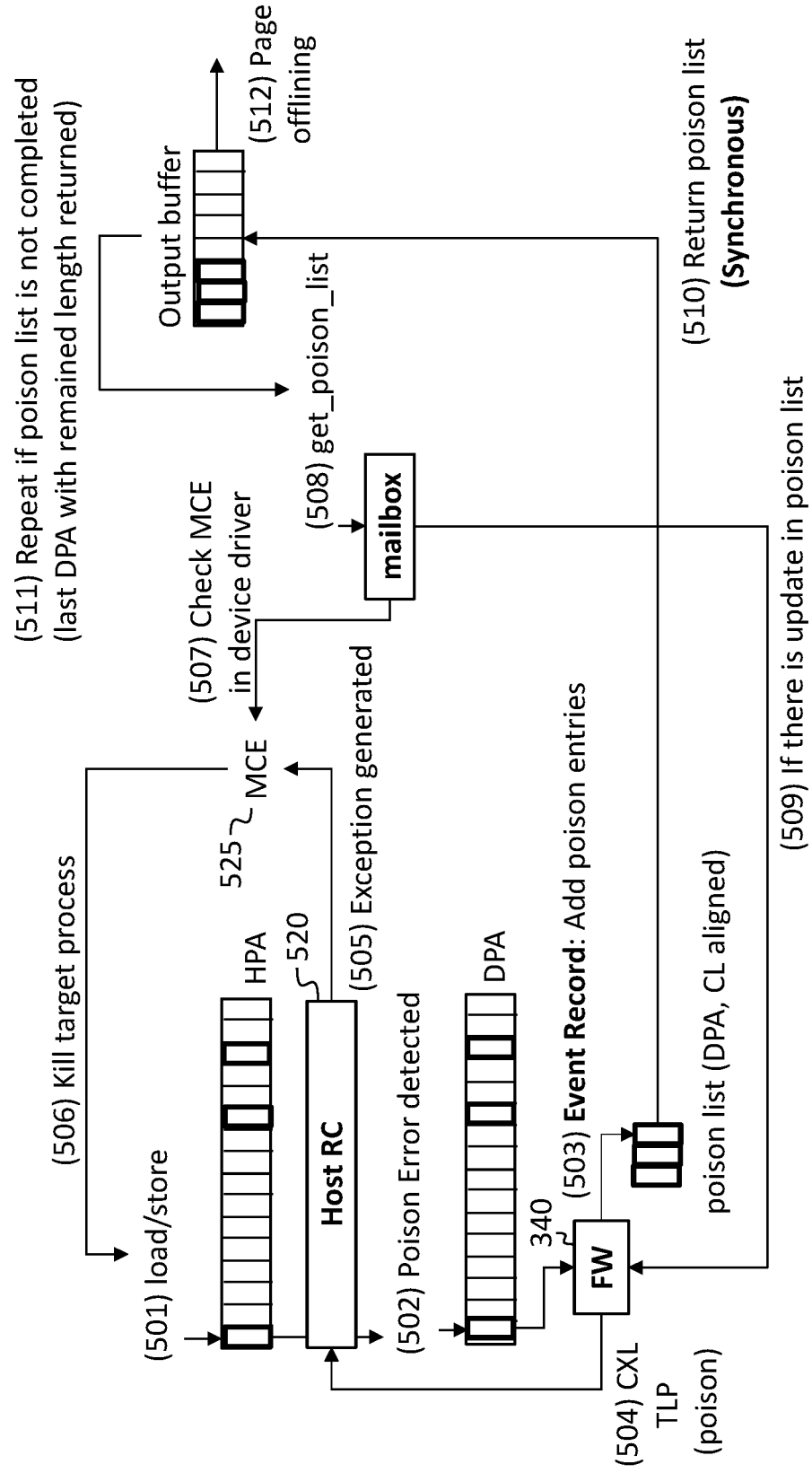
FIG. 5 is hybrid flow chart and block diagram showing online updating of page disabling, according to an embodiment of the present disclosure.

FIG. 5 shows a process for on-line updating of the poison list (or fault page list) by the device driver 320. As used herein, "on-line" updating refers to updating that is not performed in response to boot-up of the host 105 or of plugging in of the secondary memory 125 without shutting off system power. In the process of FIG. 5, load and store operations may take place at 501, as applications read data from and write data to the secondary memory 125. These load and store operations may be performed through the root complex (RC) 520 of the host 105. In the process of performing such load and store operations, the secondary memory 125 may detect, at 502, a poison error (e.g., an uncorrectable error in the memory). At 503, the secondary memory 125 may, in response to the detection of the uncorrectable error in the memory, make an entry in the event record of the secondary memory 125, the entry including the address or addresses at which the uncorrectable error or errors were detected in the memory. At 504, the secondary memory 125 may send, to the root complex (RC) 520 of the host 105 a Transaction Layer Packet (TLP) notifying the host that a fault page has been detected and that a memory access was made (e.g., by an application running on the host) involving a memory location with an uncorrectable error. The Transaction Layer Packet may be received by the root complex 520 of the host 105, and the root complex 520 of the host 105 may generate, at 505, an exception.

The machine check exception (MCE) process 525 (which may be an operating system kernel process) receives the exception, and, at 506, the machine check exception process 525 may kill the process that was involved in the access of the fault page. This process may be a user level process (e.g., in some embodiments, the secondary memory 125 may be allocated, by the operating system, only to user level processes, and not to kernel level processes). The killing of the process may help to reduce the risk that any erroneous data received, as a result of the error in the secondary memory 125, by the process, may result in additional errors, e.g., the writing of invalid data to persistent storage, by the process that was involved in the access of the fault page.

The process for disabling the fault page may proceed as follows. The device driver 320 may periodically check the status of the machine check exception process 525, and, as a result, it may determine, when the exception is generated by the root complex 520 of the host 105, that a new (previously undetected) uncorrected memory error may have been detected in the secondary memory 125 (other circumstances may cause the root complex 520 of the host 105 to generate an exception; as such, the generating of the exception does not indicate with certainty that an uncorrected memory error has been detected in the secondary memory 125). In response to making such a determination, the device driver 320 may send, at 508, a supplemental command (e.g., a get_event_records mailbox command, a scan_media mailbox command, or (as illustrated) a get_poison_list mailbox command) to (i) request the time stamp of the most recent detection of an uncorrectable error and the total number of entries in the poison list of the secondary memory 125 and (ii) if the time stamp is more recent than the time stamp received on the last occasion that the device driver 320 made such a request, the device driver 320 may, at 509, request the entire poison list from the secondary memory 125. Upon receiving this request, the secondary memory 125 may, at 510, return either (i) the entire poison list or (ii) if the poison list is too long to be returned at once (e.g., too long to fit in the output buffer of the secondary memory 125), a first portion of the poison list. The returning of the poison list may be performed synchronously (e.g., without queuing of the response in the secondary memory 125). At 511, the device driver 320 may check whether the number of poison list entries received equals the total number of entries in the poison list of the secondary memory 125; if it does not, the device driver 320 may fetch another portion of the poison list, repeating the fetching until the number of poison list entries received equals the total number of entries in the poison list of the secondary memory 125. At 512, the device driver 320 may then perform disabling of the fault pages.

Figure 6:
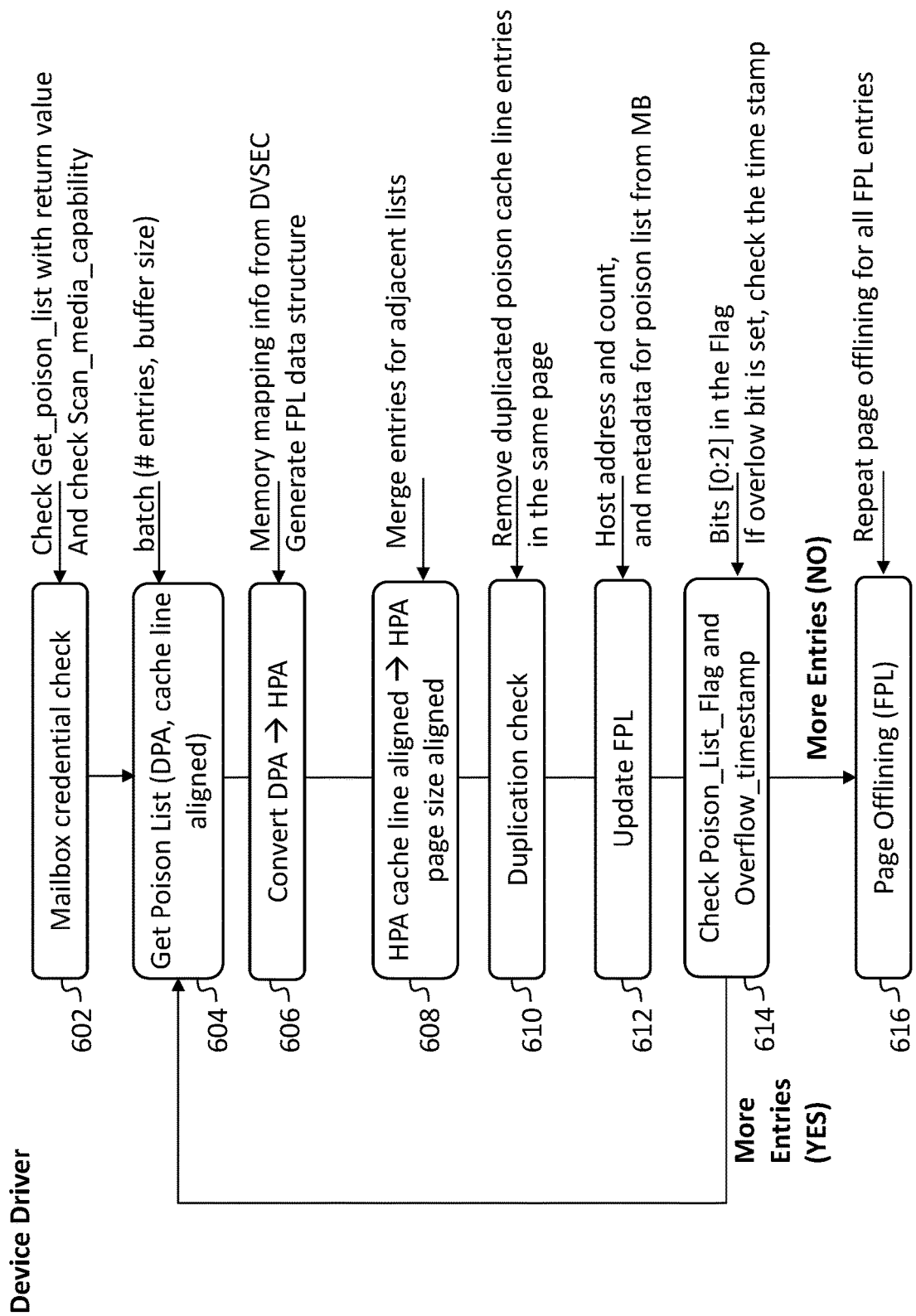
FIG. 6 is a flow chart showing page disabling, according to an embodiment of the present disclosure.

FIG. 6 shows a method for disabling pages, in some embodiments. At 602, a supplemental command (e.g., mailbox command) credential check is performed. This credential check may involve determining whether the secondary memory 125 supports the scan_media mailbox command, or the get_poison_list command. The device driver 320 may then, at 604, retrieve the poison list or (e.g., if the poison list is too long to fit in the output buffer of the secondary memory 125) a first portion of the poison list. The poison list may be a list of device physical addresses (DPAs) which are cache line aligned. At 606, the device driver 320 may convert the device physical address (DPA) of each poison list entry (each of which may be an address of a fault cache line) to a host physical address (HPA). To perform this address conversion, the device driver 320 may use memory mapping information obtained by the device driver 320 using designated vendor-specific extended capabilities (DVSEC). The driver may populate a fault page list (FPL) (or fault page list) data structure using the host physical addresses obtained as a result of the conversion. At 608, the entries from adjacent poison lists (e.g., from consecutively fetched portions of the poison list of the secondary memory 125, each of which may be list of fault cache lines) may be combined (e.g., merged) into a single list, and each entry may be aligned with a host physical address page boundary. At 610 duplicates within any page (which may be identical, after the page alignment performed at 608) may be deleted (e.g., when two fault cache lines are in the same page, the set of duplicates may be replaced with one of the set), and at 612, the fault page list structure may be updated. This structure may include a count of the number of fault pages, the address of each fault page, and metadata (e.g., a time stamp for each fault page).

Figure 7:
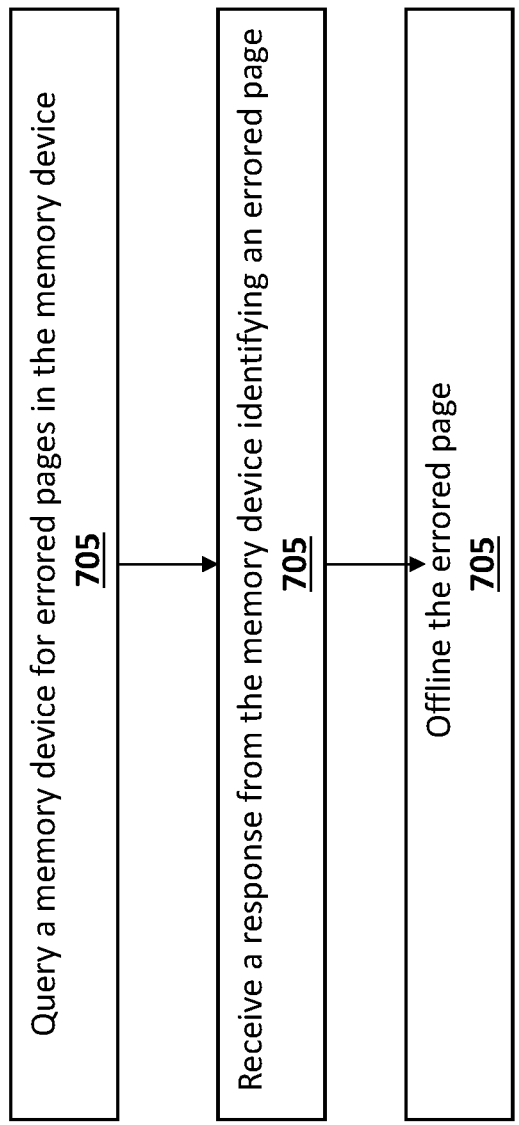
FIG. 7 is a flow chart showing querying of a device and page disabling, according to an embodiment of the present disclosure.

At 614, the poison list flag (which indicates whether the poison list maintained by the secondary memory 125 is complete) may be checked. The poison list may be incomplete, e.g., if it is too long to fit in the buffer, of the secondary memory 125, used to store the poison list. If this is the case, then the poison list may be unreliable; the device driver 320 may then obtain the time stamp for the buffer overflow event, and report to the operating system that the secondary memory 125 is unreliable. If the poison list flag is set (e.g., if no overflow has occurred) then, (i) if there are no more poison list entries to be retrieved from the secondary memory 125, the device driver may, at 616, perform disabling of all fault pages, and (ii) if there are more poison list entries to be retrieved from the secondary memory 125, the device driver may, at 604, begin repeating the process of retrieving and processing poison list entries FIG. 7 is a flowchart in some embodiments. The method includes querying, at 705, a memory device for fault pages in the memory device; receiving, at 710, a response from the memory device identifying a fault page; and disabling, at 715, the fault page. The querying of the memory device may include querying the memory device by a device driver; and the querying of the memory device may include querying the memory device using a supplemental command of a cache coherent protocol.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Some embodiments may include features of the following numbered statements.

1. A method, comprising:
    querying a memory device for fault pages in the memory device; and
    receiving a response from the memory device identifying a fault page,
    wherein:
        the querying of the memory device comprises querying the memory device by a device driver; and
        the querying of the memory device comprises querying the memory device using a supplemental command of a cache coherent protocol.

2. The method of statement 1, wherein the cache coherent protocol includes an input/output protocol, a protocol for accessing system memory, and a protocol for accessing device memory.

3. The method of statement 1 or statement 2, wherein the querying of the memory device comprises querying the memory device in connection with device driver probing.

4. The method of any one of the preceding statements, wherein:
    the device driver is configured to run in a host;
    the host is connected to the memory device; and
    the querying of the memory device comprises performing querying of the memory device related to boot-up of the host.

5. The method of any one of the preceding statements, wherein:
    the device driver is configured to run in a host;
    the host is connected to the memory device; and
    the querying of the memory device comprises performing querying of the memory device related to connecting of the memory device to a host.

6. The method of any one of the preceding statements, wherein:
    the device driver is configured to run in a host;
    the host is connected to the memory device; and
    the querying of the memory device comprises querying of the memory device based on a message sent to the host, the message notifying the host of detection of a fault page.

7. The method of any one of the preceding statements, wherein:
    the response from the memory device identifies a fault cache line; and
    the method further comprises:
        converting a device physical address of the fault cache line to a host physical address of the fault cache line.

8. The method of any one of the preceding statements, wherein:
    the response from the memory device includes a first list of fault cache lines and a second list of fault cache lines; and
    the method further comprises:
        combining the first list and the second list.

9. The method of any one of the preceding statements, wherein:
    the response from the memory device identifies a first fault cache line and a second fault cache line; and
    the method further comprises:
        converting a device physical address of the first fault cache line to a host physical address of the first fault cache line; and
        converting a device physical address of the second fault cache line to a host physical address of the second fault cache line.

10. The method of any one of the preceding statements, wherein:
    the response from the memory device identifies a first fault cache line and a second fault cache line; and
    the method further comprises:
        determining that the second fault cache line is in a same page as the first fault cache line; and
        replacing the first fault cache line and the second fault cache line with the first fault cache line.

11. A system, comprising:
    a host comprising:
        a processing circuit; and
        memory connected to the processing circuit, the memory storing instructions that, when executed by the processing circuit, causes performance of a method, the method comprising:
    querying a memory device for fault pages in the memory device; and
    receiving a response from the memory device identifying a fault page,
    wherein:
        the querying of the memory device comprises querying the memory device by a device driver; and
        the querying of the memory device comprises querying the memory device using a supplemental command of a cache coherent protocol.

12. The system of statement 11, wherein the cache coherent protocol includes an input/output protocol, a protocol for accessing system memory, and a protocol for accessing device memory.

13. The system of statement 11 or statement 12, wherein the querying of the memory device comprises querying the memory device in connection with device driver probing.

14. The system of any one of statements 11 to 13, wherein:
the device driver is configured to run in the host;
the host is connected to the memory device; and
the querying of the memory device comprises performing querying of the memory device related to boot-up of the host.

15. The system of any one of statements 11 to 14, wherein:
the device driver is configured to run in the host;
the host is connected to the memory device; and
the querying of the memory device comprises performing querying of the memory device related to connecting of the memory device to the host.

16. The system of any one of statements 11 to 15, wherein:
the device driver is configured to run in the host;
the host is connected to the memory device; and
the querying of the memory device comprises querying of the memory device based on a message sent to the host, the message notifying the host of detection of a fault page.

17. The system of any one of statements 11 to 16, wherein:
the response from the memory device identifies a fault cache line; and
the method further comprises:
converting a device physical address of the fault cache line to a host physical address of the fault cache line.

18. The system of any one of statements 11 to 17, wherein:
the response from the memory device includes a first list of fault cache lines and a second list of fault cache lines; and
the method further comprises:
merging the first list and the second list.

19. The system of any one of statements 11 to 18, wherein:
the response from the memory device identifies a first fault cache line and a second fault cache line; and
the method further comprises:
converting a device physical address of the first fault cache line to a host physical address of the first fault cache line; and
converting a device physical address of the second fault cache line to a host physical address of the second fault cache line.

20. A system, comprising:
a host comprising:
means for processing; and
memory connected to the means for processing, the memory storing instructions that, when executed by the means for processing, causes performance of a method, the method comprising:
querying a memory device for fault pages in the memory device; and
receiving a response from the memory device identifying a fault page,
wherein:
the querying of the memory device comprises querying the memory device by a device driver; and
the querying of the memory device comprises querying the memory device using a supplemental command of a cache coherent protocol.

Although exemplary embodiments of a system and method for fault page handling have been specifically described and illustrated herein, many modifications and variations will be apparent to those skilled in the art. Accordingly, it is to be understood that a system and method for fault page handling constructed according to principles of this disclosure may be embodied other than as specifically described herein. The invention is also defined in the following claims, and equivalents thereof.

What is claimed is:

1. A method, comprising:
querying a memory device for fault pages in the memory device; and
receiving a response from the memory device identifying a fault page,
wherein:
the querying of the memory device comprises querying the memory device by a device driver based on a probing operation by the device driver; and
the querying of the memory device comprises querying the memory device using a supplemental command of a cache coherent protocol.

2. The method of claim 1, wherein the cache coherent protocol includes an input/output protocol, a protocol for accessing system memory, and a protocol for accessing device memory.

3. The method of claim 1, wherein the device driver is configured to perform hardware-specific operations for the memory device.

4. The method of claim 1, wherein:
the device driver is configured to run in a host;
the host is connected to the memory device; and
the querying of the memory device comprises performing querying of the memory device based on boot-up of the host.

5. The method of claim 1, wherein:
the device driver is configured to run in a host;
the host is connected to the memory device; and
the querying of the memory device comprises performing querying of the memory device based on connecting of the memory device to a host.

6. The method of claim 1, wherein:
the device driver is configured to run in a host;
the host is connected to the memory device; and
the querying of the memory device comprises querying of the memory device based on a message sent to the host, the message notifying the host of detection of a fault page.

7. The method of claim 1, wherein:
the response from the memory device identifies a fault cache line; and
the method further comprises:
converting a device physical address of the fault cache line to a host physical address of the fault cache line.

8. The method of claim 1, wherein:
the response from the memory device includes a first list of fault cache lines and a second list of fault cache lines; and
the method further comprises:
combining the first list and the second list.

9. The method of claim 1, wherein:
the response from the memory device identifies a first fault cache line and a second fault cache line; and
the method further comprises:
converting a device physical address of the first fault cache line to a host physical address of the first fault cache line; and converting a device physical address of the second fault cache line to a host physical address of the second fault cache line.

10. The method of claim 1, wherein:
the response from the memory device identifies a first fault cache line and a second fault cache line; and
the method further comprises:
   determining that the second fault cache line is in a same page as the first fault cache line; and
   replacing the first fault cache line and the second fault cache line with the first fault cache line.

11. A system, comprising:
a host comprising:
   a processing circuit; and
   memory connected to the processing circuit, the memory storing instructions that, when executed by the processing circuit, causes performance of a method, the method comprising:
querying a memory device for fault pages in the memory device; and
receiving a response from the memory device identifying a fault page,
wherein:
   the querying of the memory device comprises querying the memory device by a device driver based on a probing operation by the device driver; and
   the querying of the memory device comprises querying the memory device using a supplemental command of a cache coherent protocol.

12. The system of claim 11, wherein the cache coherent protocol includes an input/output protocol, a protocol for accessing system memory, and a protocol for accessing device memory.

13. The system of claim 11, wherein the device driver is configured to perform hardware-specific operations for the memory device.

14. The system of claim 11, wherein:
the device driver is configured to run in the host;
the host is connected to the memory device; and
the querying of the memory device comprises performing querying of the memory device based on boot-up of the host.

15. The system of claim 11, wherein:
the device driver is configured to run in the host;
the host is connected to the memory device; and
the querying of the memory device comprises performing querying of the memory device based on connecting of the memory device to the host.

16. The system of claim 11, wherein:
the device driver is configured to run in the host;
the host is connected to the memory device; and
the querying of the memory device comprises querying of the memory device based on a message sent to the host, the message notifying the host of detection of a fault page.

17. The system of claim 11, wherein:
the response from the memory device identifies a fault cache line; and
the method further comprises:
   converting a device physical address of the fault cache line to a host physical address of the fault cache line.

18. The system of claim 11, wherein:
the response from the memory device includes a first list of fault cache lines and a second list of fault cache lines; and
the method further comprises:
   merging the first list and the second list.

19. The system of claim 11, wherein:
the response from the memory device identifies a first fault cache line and a second fault cache line; and
the method further comprises:
   converting a device physical address of the first fault cache line to a host physical address of the first fault cache line; and
   converting a device physical address of the second fault cache line to a host physical address of the second fault cache line.

20. A system, comprising:
a host comprising:
   means for processing; and
   memory connected to the means for processing, the memory storing instructions that, when executed by the means for processing, causes performance of a method, the method comprising:
querying a memory device for fault pages in the memory device; and
receiving a response from the memory device identifying a fault page,
wherein:
   the querying of the memory device comprises querying the memory device by a device driver based on a probing operation by the device driver; and
   the querying of the memory device comprises querying the memory device using a supplemental command of a cache coherent protocol.

* * * * *